April 16, 1963 G. RAISBECK 3,086,080

SELF-TIMED REGENERATIVE REPEATER FOR PCM

Filed June 14, 1961 2 Sheets-Sheet 1

INVENTOR
G. RAISBECK
BY Harry C. Hart
ATTORNEY

SELF-TIMED REGENERATIVE REPEATER FOR PCM

Filed June 14, 1961 2 Sheets-Sheet 2

INVENTOR
G. RAISBECK
BY Harry C. Hart
ATTORNEY 3,086,080

SELF-TIMED REGENERATIVE REPEATER FOR PCM

Gordon Raisbeck, Bernard Township, Somerset County, N.J., assignor to Bell Telephone Laboratories, Incorporated, New York, N.Y., a corporation of New York Filed June 14, 1961, Ser. No. 117,044
11 Claims. (Cl. 178—70)

This invention deals with the regeneration of the pulses of an incoming train, especially one which carries message wave samples in the form of code groups of on-or-off pulses. Its principal object is to improve the certainty of the retiming of degraded incoming pulses. A related object is to simplify the retiming apparatus.

In the normal pulse code transmission system, mark pulses and space pulses (sometimes termed ON pulses and OFF pulses) are generated, at a transmitter station, at discrete instants on the time scale that follow each other with complete regularity, while the information carried by a train of such pulses takes the form of permutation code groups of them. As initially generated, the pulses are of one or the other of two recognizably different amplitudes which may, for simplicity, be designated unity and zero.

When a train of such pulses is transmitted over a long distance, they are inevitably degraded in character, in part by the accretion of noise and in part by the characteristics of the transmission medium. A great advantage of the technique of pulse code modulation (PCM) is that, before the degradation has risen to the danger point, it is possible, in principle, to regenerate the individual pulses perfectly, standardizing their amplitudes and their shapes and regularizing their instants of occurrence on the time scale.

In practice, regeneration of amplitude and shape are comparatively simple matters, but retiming the pulses, i.e., regularizing their instants of occurrence on the time scale, has presented many subtle difficulties.

One approach to the retiming problem is to provide, at each repeater station, a local source of highly stable self-oscillations whose frequency is governed by phase comparison of its own output with the incoming pulse train. While such a system has many advantages, it is open to all of the objections of detail which hold, in general, for a feedback system.

Another approach to the retiming problem is to derive from the incoming train of pulses itself, and with the aid of a selecting filter, a timing wave whose frequency is the basic repetition rate or fundamental frequency of the train. For frequency stability of this timing wave, the pass band of the selecting filter must, of course, be narrow; but this carries with it a steep phase-frequency characteristic such that the filter output may vary widely in phase with a minute departure of the frequency of the fundamental component of the incoming pulse train from its nominal value.

It is a specific object of the present invention to compensate for the phase-frequency characteristic of the selecting filter. In accordance with the invention this is done by intermodulating the incoming pulse train itself with the output wave of the selecting filter, preferably after normalizing the amplitude of the latter as by clipping. Among the modulation products formed by the modulator is the lower "difference frequency" term which contains, as a factor, the cosine of the phase displacement angle introduced by the selecting filter. Because the frequencies of the two inputs to the modulator are alike, the difference frequency itself is zero, so that this lower order modulation product varies only very slowly and in conformance with the phase displacement introduced by the filter. Thus, the magnitude of the output of the modulator is a measure of the phase displacement introduced by the selecting filter.

Further in accordance with the invention, this lower order modulation product is utilized to adjust the threshold of operation of a control element to which the output wave of the selecting filter is also applied. The control element, which may be a trigger circuit, is proportioned to respond when, and only when, the amplitude of the wave applied to it rises above the threshold determined by the modulator output. Advantageously, the control element, or another circuit component associated with it, is proportioned to deliver a brief sharp pulse or "spike" of current at each instant at which the incoming pulse train first exceeds the threshold. Analysis shows that, provided the attenuation introduced by the selecting filter is inconsiderable, each of the auxiliary pulses thus derived lies in the exact center of the nominal interval or "time slot" in which one of the incoming pulses, were it not degraded, would lie. These auxiliary pulses are now employed to control the operation of a regenerator for the primary pulses in such a fashion as to take a brief sample of each one at the proper instant independent of the actual time at which the pulse, as degraded, arrives.

Because one of the two inputs to the control element is the output of the selecting filter whose amplitude depends on the loss introduced by the filter, the output of the control element bears a second order relation to the attenuation introduced by the filter. This attenuation is small at the midband frequency. With a filter of complex construction, the attenuation may be made largely independent of frequency over a substantial portion of the pass band. But with a simpler filter, for example, a simple resonant circuit, the attenuation it introduces is greater at frequencies above and below the midband frequency than at the midband frequency. Therefore, without more, the output of the control element, which depends primarily on the phase shift introduced by the selecting filter, includes a secondary dependence on the attenuation introduced by the filter. Hence the sampling pulses do not, in fact, fall in the exact centers of their proper time slots, but deviate slightly from these centers on account of the attenuation introduced by the selecting filter.

In accordance with a further feature of the invention this effect is compensated by the inclusion of an amplitude compressor in the output path of the product modulator. The compressor can readily be proportioned to have an input-output characteristic that modifies the output of the product modulator to compensate, to any desired degree of accuracy, for the amplitude variations that appear in the output of the selecting filter due to shifts in the frequency of its input.

The invention will be fully comprehended from the following detailed description of an illustrative embodiment thereof, taken in connection with the appended drawings in which.

Figures 1, 3:
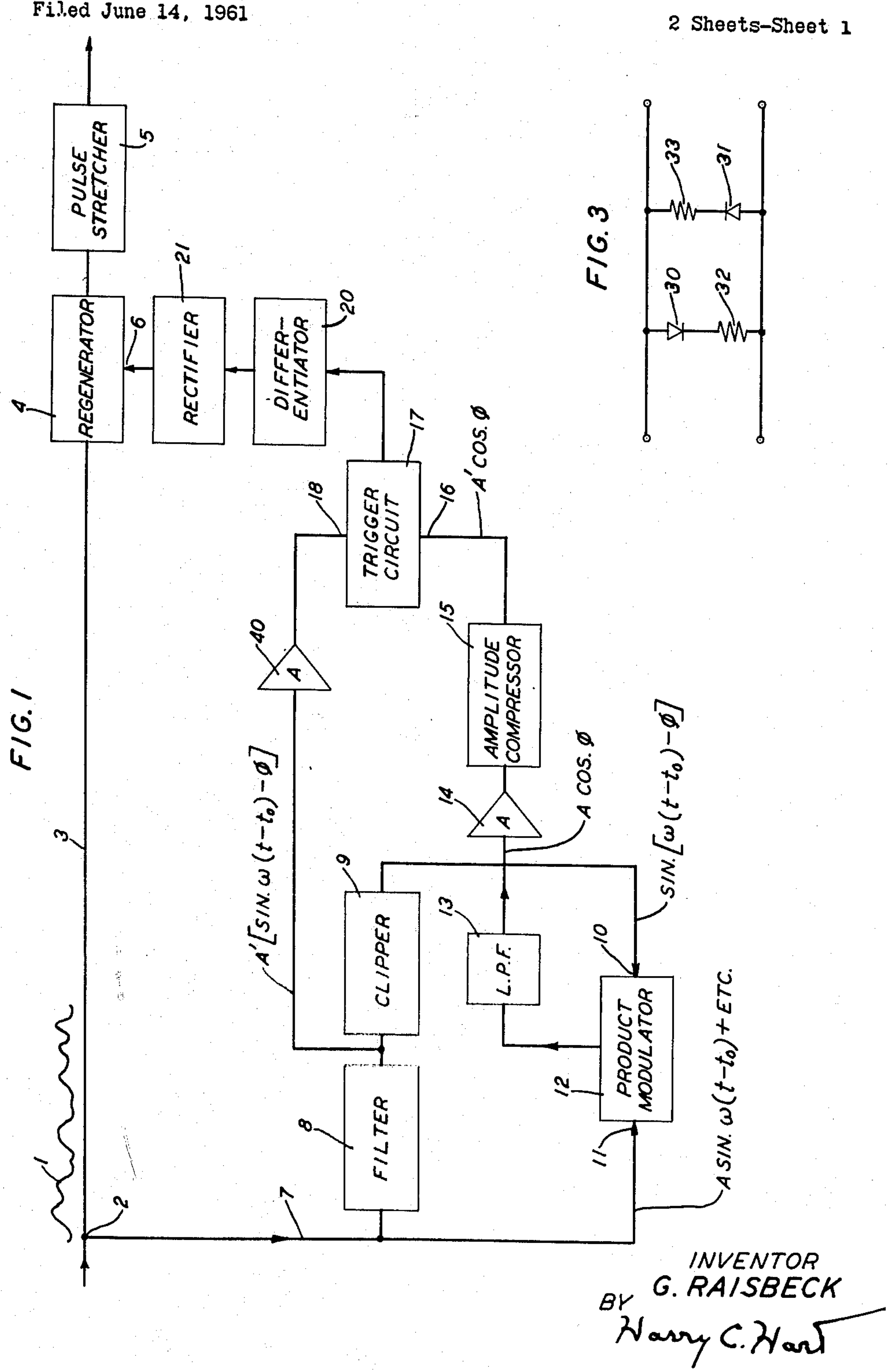
FIG. 1 is a block schematic diagram showing a pulse repeater in accordance with the invention.
FIG. 3 is a schematic circuit diagram of the amplitude compressor of FIG. 1.

Referring now to the drawings, a train 1 of pulses which may have originated at a distant point and been degraded, in the course of transmission, both in amplitude and in timing, appears at the input point 2 of the repeater shown in FIG. 1 and is applied over a message path 3 to the input point of a regenerator 4. The regenerator 4, which may be of conventional construction, operates to standardize the amplitudes of all pulses applied to its input point and to take brief samples of the standardized amplitudes under control of clock pulses delivered to its control point 6, after which each such brief sample is lengthened by a stretcher 5 to occupy approximately one half of its nominal time interval. The correct timing of the regenerated pulses thus depends on the delivery of clock pulses to the control point 6 of the regenerator 4 at the proper instants.

To provide properly timed clock pulses, the input pulse train 1 is applied over a by-path 7 to a selecting filter 8 of the band-pass variety, so proportioned that its mid-frequency is the same as the nominal recurrence rate $f_0$ of the pulses of the incoming train 1 while its pass band may extend from approximately $.95\ f_0$ to $1.05\ f_0$. The filter 8 operates to block all components of the incoming pulse train that lie outside of its pass band. At the same time it modifies the amplitude of the fundamental component and shifts it in phase. When the frequency of the fundamental component of the input wave 1 departs only slightly from its nominal value, the attenuation introduced by the selecting filter 8 is small but the phase shift associated with the same departure may be large.

In analytical terms, the input wave 1 may be represented by $$A \sin [\omega(t-t_0)]+\text{etc.} \tag{1}$$

where the second term represents all components of frequencies other than the fundamental frequency $\omega/2\pi$. The output of the filter 8 may then be represented by $$A' \sin [\omega(t-t_0)-\varphi] \tag{2}$$

where, over a range of frequencies comparable with the pass band of the selecting filter, A′ differs but little from A, but where the phase shift $\phi$ may be substantial magnitude.

The output of the filter 8 is passed through a clipper 9, which may be of conventional construction, that operates to standardize the amplitude of the filter output. As thus standardized, the filter output may be represented by $$\sin [\omega(t-t_0)-\varphi] \tag{3}$$

In accordance with the present invention, the output of the clipper 9 and the incoming pulse train 1 itself are respectively applied to the two input points 10, 11 of a product modulator 12. This component forms cross products of the various frequency components of its two inputs. Among these is the difference frequency component, and this alone is passed by a low pass filter 13 to the remainder of the apparatus.

Accordingly this component, at the output of the filter 13 has the magnitude $$A \cos \varphi \tag{4}$$

Disregarding, for the present, the amplifier 14 and the amplitude compressor 15 in the output path of the low pass filter 13, its output, expression 4 is applied to one input point 16 of a control element 17, e.g., a trigger circuit, to whose other input point 18 the output of the selecting filter 8 given by expression 2 is applied. The low frequency signal, expression 4 operates to bias the control element beyond its cutoff for any high frequency signal applied to its second input point that is of smaller magnitude than the bias. As soon, however, as the high frequency signal exceeds the low frequency signal in magnitude, the control element 17 commences to deliver current. With appropriate conventional proportions, the current remains substantially constant for further increase in the magnitude of the high frequency input signal over the bias provided by the low frequency input signal. The current delivered by the element 17 falls to zero magnitude when, in less than one period of the high frequency signal, the latter again falls below the bias threshold. The leading edge of each such current pulse is converted to a brief voltage pulse by a differentiator 20.

The instant of commencement of each current pulse, and hence the instant of occurrence of each voltage pulse, may be determined by equating the magnitude of the low frequency input to the control element 17, expression 4, with the magnitude of the high frequency input, expression 2. Thus $$A' \sin [\omega(t-t_0)-\varphi]=A \cos \varphi \tag{5}$$

Disregarding, for the present, the difference between A′ and A this leads to $$\omega(t-t_0)-\varphi=\frac{\pi}{2}\pm\varphi+2n\pi \tag{6}$$

whence $$t-t_0=\left(2n+\frac{1}{2}\right)\frac{\pi}{\omega} \tag{7}$$

or $$t-t_0=\frac{\left[\left(2n+\frac{1}{2}\right)\pi+2\varphi\right]}{\omega} \tag{8}$$

Equation 7 states that the instants of equality of the two inputs to the control element 17 occur exactly at the end of the first quarter of each cycle of the fundamental frequency. Hence, they are the required sampling instants at which the regenerator 4 is to take samples of the input wave 1. Equation 8 gives a different set of instants of equality, but these are readily excluded by inclusion of a rectifier 21 in the output path of the control element 17.

Figure 2:
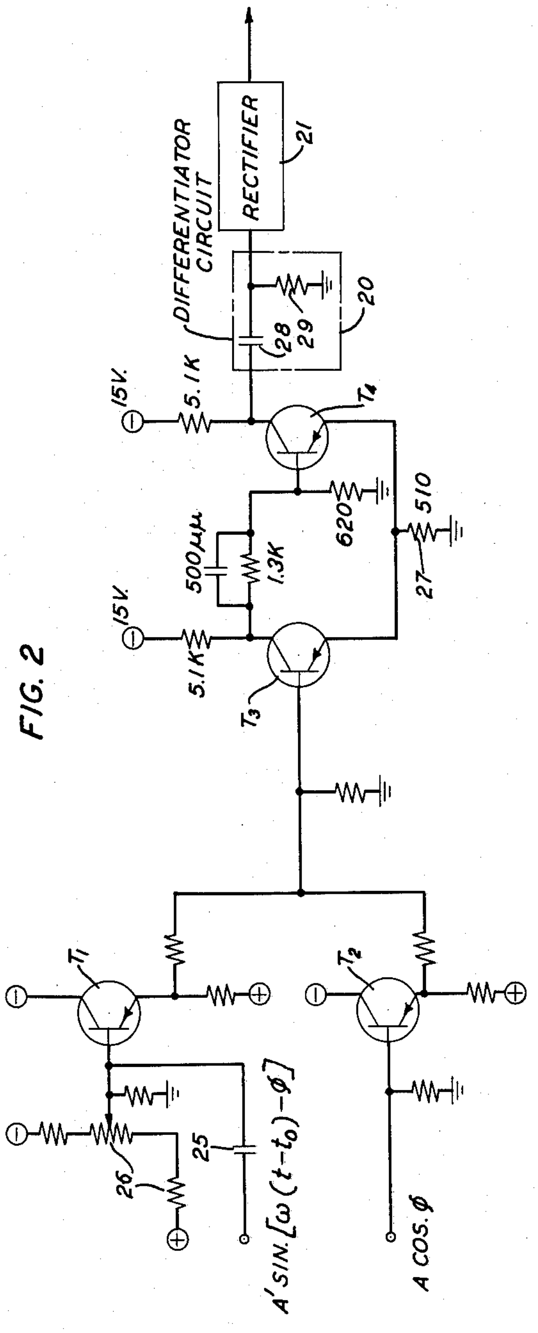
FIG. 2 is a schematic circuit diagram of the control element of FIG. 1.

FIG. 2 shows the details of an actual circuit with which success has been achieved. The high frequency output of the selecting filter 8 is applied through a coupling condenser 25 to the base of a first transistor $T_1$ connected in the emitter-follower configuration, while the low frequency output of the product modulator 12 is applied to the base of a second transistor $T_2$ similarly connected. The outputs are taken from the two emitters and applied together to the base of a third transistor $T_3$ that is asymmetrically cross-coupled to a fourth transistor $T_4$ in a fashion that is conventional for single trip trigger devices. With the magnitudes shown for the circuit elements the transistor $T_4$, operated in this fashion, remains cut off in the presence of a low frequency signal applied to the input point of the transistor $T_2$ until the magnitude of the high frequency input, applied to the transisor $T_1$ exceeds it. The point at which the transistor $T_4$ commences to conduct may be refined to exact equality between the magnitudes of the inputs applied to the transistors $T_1$ and $T_2$ by an adjustable bias control for the first transistor derived from a potentiometer 26. As soon as the transistor $T_4$ commences to conduct, regeneration by way of the common emitter resistor 27 increases its conduction and a current surge results, which drives the transistor $T_4$ to saturation. This current surge is converted into a sharp pulse of voltage by the combination of a series condenser 28 and a shunt load resistor 29, proportioned in the fashion conventional in differentiating circuits, and together constituting the differentiator 20. When the high frequency input falls below the low frequency input, the transistor $T_4$ is abruptly cut off and a pulse of opposite sign appears across the load resistor 29. This second pulse may, if desired, be eliminated by a rectifier 21. This will usually be unnecessary on account of the fact that the regenerator 4 may readily be made insensitive to it.

Figure 4:
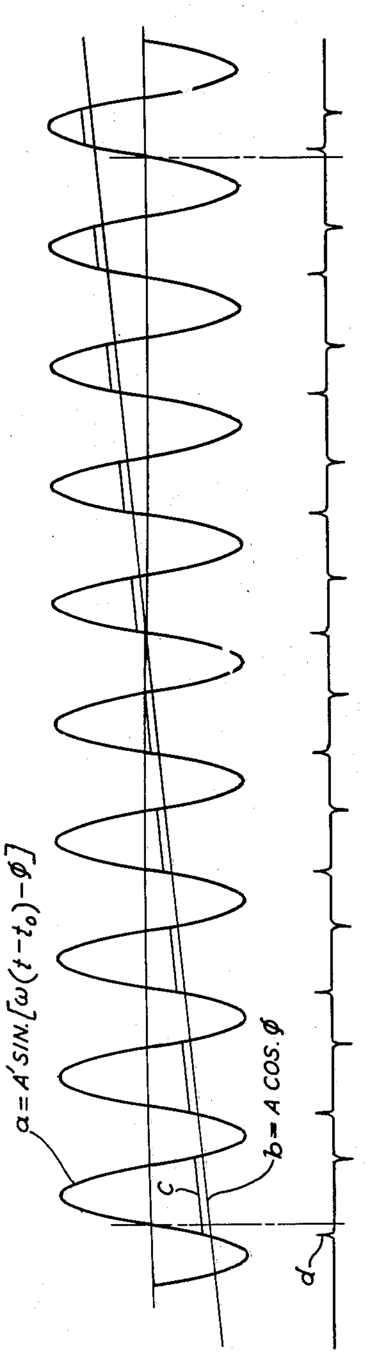
FIG. 4 is a wave form diagram of use in the exposition of the invention.

The mode of operation of the system as thus described is illustrated in FIG. 4 wherein curve *a* represents the output of the selecting filter 8 as given by expression 2 while curve *b* represents the output of the low pass filter 13 as given by expression 4. Since, in any practical case, the variations of the latter are very slow compared with those of the former, only a fraction of a cycle of the curve *b* is shown.

The square-topped pulses, curve *c* represent the output of the transistor $T_4$ of FIG. 2, while curve *d* shows the output of the differentiator 20. Each positive pulse of curve *d* coincides in time with the passage of the curve *a* above the curve *b*, while each negative pulse of curve *d* coincides in time with the transposition of the magnitudes of curves *a* and *b*.

It is evident from curve *d* that the instant of occurrence of a positive pulse takes place slightly earlier than its nominal time when the low frequency wave is negative, and slightly later when it is positive. This is precisely that is required of the control pulses applied to the regenerator 4 in order to take samples of the pulses of the incoming train 1 at the required instants.

When the construction of the selecting filter 8 is such that its output undergoes significant variations of amplitude as the frequency of the incoming pulse train departs from its nominal value, A′ may fall significantly below A for frequency deviations of the incoming pulse train either above or below the nominal midband frequency. This effect somewhat perturbs the results given above. In many cases, the perturbation is inconsequential. When it is considered to be of sufficient consequence to call for compensation, such compensation may readily be achieved by the use of an amplitude compressor 15 in the output path of the product modulator 12 as shown in FIG. 1. A simple combination of two oppositely poled diodes 30, 31 connected together in shunt, as shown in FIG. 3, each padded by a resistor 32, 33 in series with it, is well known to present an input-output characteristic having odd symmetry; i.e., it may be represented, to a high degree of approximation, by a cubic curve. The input to this compressor 15 may be caused to swing over a suitable range of this characteristic merely by adjustment of its magnitude. To this end an amplifier 14, whose gain may be positive or negative, as needed to cause the desired swing, is included ahead of the compressor 15. With this arrangement, the output of the compressor 15, while continuing to depend principally on the output of the product modulator 12 now departs from this dependence to a small extent in just such a way as to compensate, with a high degree of precision, for the ampliftude variations of the output of the selecting filter 8. Accordingly, while the output of the low pass filter 13 is designated, in accordance with expression 4 as $$A \cos \varphi \qquad (4)$$

the output of the amplitude compressor 15 is designated, instead, as $$A' \cos \varphi \qquad (4a)$$

and the pulses delivered by the differentiator 20 to the regenerator 4 take place at the required instants with substantial exactitude, bearing only an inconsequential relation to the fluctuations of the amplitude of the output of the selecting filter 8.

In order that the magnitudes of the two input signals to the control element 17 may be matched in amplitude, despite the adjustment of the low-frequency one to suit the requirements of the compressor, a compensating amplifier 40, of gain (or loss) differing slightly from that of the amplifier 14, may be included at an appropriate point of the circuit, for example, in tandem with the high frequency signal input to the terminal 18 of the control element 17.

In the foregoing description of the operation of the invention it is assumed that the low frequency signal input to the modulator, expression 4, originated in fluctuations of the fundamental frequency component of the incoming train about its mean nominal value. The operation of the apparatus is the same, even though the deviation of the phase of the incoming train from its nominal value be a fixed offset in contrast to a fluctuation. By the same token, its operation is the same when the mean value of the phase of the incoming train is exactly equal to its nominal value with or without fluctuations about this value, while the mid-frequency of the selecting filter is, due to errors in manufacture or secular variation, somewhat offset from this correct nominal frequency.

What is claimed is:

1. The method of retiming degraded pulses of an incoming train which comprises reactively selecting the fundamental component of said incoming train, intermodulating said selected fundamental component with said original train to derive a modulation product signal that is representative of a frequency-dependent phase displacement that is an inherent consequence of said selection operation, generating a train of clock pulses in synchronism with said fundamental component, utilizing said modulation product signal to modify the instants of occurrence of clock pulses in a sense to offset any phase shift introduced into said fundamental component by said reactive selection, and sampling the pulses of said incoming train under control of said clock pulses as modified.

2. The method of retiming degraded pulses of an incoming train which comprises reactively selecting the fundamental component of said incoming train, intermodulating said selected fundamental component with said original train to derive a modulation product signal that is representative of a frequency-dependent phase displacement that is an inherent consequence of said selection operation, utilizing said modulation product signal to control the instants of occurrence of otherwise regular clock pulses, and sampling the pulses of said incoming train under control of said clock pulses as controlled.

3. In pulse repeater apparatus comprising a regenerator for a train of incoming pulses, means for developing timing pulses for control of said regenerator which comprises a band-pass filter connected and proportioned to selectively pass substantially only the fundamental frequency component of said train, said filter having a phase-frequency characteristic such that the phase of its output is sensitive to minute variations of the frequency of its input, means for intermodulating said passed fundamental component with said incoming train to develop a modulation product signal that is representative of a phase displacement introduced by said filter, means for developing clock pulses in synchronism with said fundamental component, means for modifying the instants of occurrence of said clock pulses, under control of said modulation product signal in a sense to offset any phase-shift introduced into said fundamental component by said band-pass filter, and means for utilizing said phase-shifted clock pulses as timing pulses to control said regenerator.

4. In combination with apparatus as defined in claim 3 wherein said band-pass filter is proportioned to introduce into said selected fundamental component a secondary frequency-dependent variation of amplitude, means for compensating said amplitude variation which comprises an amplitude compressor, and connections for passing said modulation product through said compressor, said compressor having an input-output characteristic characterized by odd symmetry, whereby said modulation product, as modified by the compressor, consists of two factors of which one represents the phase displacement introduced by the selecting filter while the other represents amplitude variations introduced by the selecting filter.

5. In combination with apparatus as defined in claim 4 wherein said compressor is so proportioned that its input-output characteristic manifests a desired nonlinearity over a specified amplitude range, means for ensuring correct amplitude variation compensation by said compressor which comprises an amplitude normalizing device connected to receive said modulation product and deliver it, as normalized, to said compressor, said device being proportioned to swing the input to the compressor over its full range when the input to the device has its maximum magnitude.

6. In pulse repeater apparatus comprising a regenerator for incoming pulses, means for developing timing pulses for control of said regenerator which comprises a band-pass filter connected and proportioned to selectively pass substantially only the fundamental frequency component of said train, said filter having a phase-frequency characteristic such that the phase of its output is sensitive to minute variations of the frequency of its input, means for intermodulating said passed fundamental component with said incoming train, to develop a modulation product that is representative of a phase displacement introduced by said filter, a control element having an adjustable threshold of operation and proportioned to deliver pulses when driven above its threshold, means for adjustably biasing said control element below its threshold by said modulation product, means for applying said selected fundamental component to said control element in a sense to drive it above its threshold when, and only when, said band-pass filter output exceeds the bias of said modulation product, and means for applying the output pulses of said control element to the control terminal of said regenerator.

7. In combination with apparatus as defined in claim 6 wherein said band-pass filter is proportioned to introduce into said selected fundamental component a secondary frequency-dependent variation of amplitude, means for compensating said amplitude variation which comprises an amplitude compressor, and connections for passing said modulation product through said compressor, said compressor having an input-output characteristic characterized by odd symmetry, whereby said modulation product, as modified by the compressor, consists of two factors of which one represents the phase displacement introduced by the selecting filter while the other represents amplitude variations introduced by the selecting filter.

8. In combination with apparatus as defined in claim 7 wherein said compressor is so proportioned that its input-output characteristic manifests a desired nonlinearity over a specified amplitude range, means for ensuring correct amplitude variation compensation by said compressor which comprises an amplitude normalizing device connected to receive said modulation product and deliver it, as normalized, to said compressor, said device being proportioned to swing the input to the compressor over its full range when the input to the device has its maximum magnitude.

9. In pulse repeater apparatus comprising a receiving circuit for a train of incoming pulses to be repeated and a regenerator connected in tandem with said circuit and having a timing control terminal, means for developing clock pulses for application to said control terminal which comprises a by-path connected in shunt with said receiving circuit, a band-pass filter included in said by-path proportioned to pass the fundamental frequency component of said train and to block other components of said train, said filter having a phase-frequency characteristic such that the phase of its output is sensitive to minute variations of the frequency of its input, a product modulator having a first input point, a second input point and an output point, means for supplying said incoming pulse train to said first input point, means for supplying the output of said band-pass filter to said second input point, a low pass filter connected to the output point of said modulator and proportioned to block all components of the modulator output other than the component of lowest frequency, whereby the output of said low pass filter is representative of the phase shift introduced by said bandpass filter, a control element having an adjustable threshold of operation and proportioned to deliver a pulse when driven above its threshold, means for adjustably biasing said control element below its threshold of operation by the output of said low pass filter, means for applying the output wave of said band-pass filter to said control element in a sense to drive it above its threshold when, and only when, said band-pass filter output exceeds the bias of said low pass filter output, and means for applying the output pulses of said control element to the control terminal of said regenerator.

10. In combination with apparatus as defined in claim 9 wherein said band-pass filter is proportioned to introduce into said selected fundamental component a secondary frequency-dependent variation of amplitude, means for compensating said amplitude variation which comprises an amplitude compressor connected in tandem with the output point of said product modulator, said compressor having an input-output characteristic characterized by odd symmetry, whereby the output of the modulator, as modified by the compressor, consists of two factors of which one represents the phase displacement introduced by the selecting filter while the other represents amplitude variations introduced by the selecting filter.

11. In combination with apparatus as defined in claim 10 wherein said compressor is so proportioned that its input-output characteristic manifests a desired nonlinearity over a specified amplitude range, means for ensuring correct amplitude variation compensation by said compressor which comprises an amplitude normalizing device connected in tandem between the output point of said product modulator and said compressor, said device being proportioned to swing the input to the compressor over its full range when the output of the product modulator has its maximum magnitude.

No references cited.